(12) United States Patent
Rott et al.

(10) Patent No.: US 6,890,434 B2
(45) Date of Patent: May 10, 2005

(54) BACKFLUSH FILTER, IN PARTICULAR FOR FILTERING LUBRICANT OIL

(75) Inventors: Willi Rott, Bornheim (DE); Wilhelm Vieten, Wegberg (DE); Heinz Heinrich Leonhard Sindorf, Rommerskirchen (DE); Rüdiger Lennartz, Pulheim (DE); Sivagnanam Kandiah, Pulheim (DE)

(73) Assignee: Boll & Kirch Filterbau GmbH (DE)

( * ) Notice: Subject to any disclaimer, the term of this patent is extended or adjusted under 35 U.S.C. 154(b) by 209 days.

(21) Appl. No.: 10/275,520

(22) PCT Filed: May 17, 2001

(86) PCT No.: PCT/EP01/05615

§ 371 (c)(1),
(2), (4) Date: Nov. 6, 2002

(87) PCT Pub. No.: WO01/89659

PCT Pub. Date: Nov. 29, 2001

(65) Prior Publication Data

US 2003/0136715 A1 Jul. 24, 2003

(30) Foreign Application Priority Data

May 19, 2000 (DE) .......................................... 100 24 401

(51) Int. Cl.[7] .............................................. B01D 35/12
(52) U.S. Cl. ..................... 210/333.1; 210/414; 210/411
(58) Field of Search ........................ 210/333.01, 333.1, 210/414, 411

(56) References Cited

U.S. PATENT DOCUMENTS

| | | |
|---|---|---|
| 3,280,980 A | 10/1966 | King |
| 3,318,452 A | 5/1967 | Adams |
| 3,380,591 A | 4/1968 | Muller |
| 4,085,051 A * | 4/1978 | Kaminsky et al. ..... 210/333.01 |
| 4,415,448 A | 11/1983 | Lennartz et al. |
| 2002/0092814 A1 * | 7/2002 | Kangasniemi et al. ...... 210/791 |

FOREIGN PATENT DOCUMENTS

| | | |
|---|---|---|
| DE | 12 99 284 B | 12/1969 |
| DE | 31 15 716 A | 11/1982 |
| EP | 0 656 223 A | 6/1995 |
| RU | 2 082 484 C | 6/1997 |

* cited by examiner

Primary Examiner—Terry K. Cecil
(74) Attorney, Agent, or Firm—Fay, Sharpe, Fagan, Minnich & McKee, LLP

(57) ABSTRACT

A backflushing filter for filtering oil includes filter candles 22 which are open at both ends 24, 34 and disposed around a rotary shaft 1 in a filter housing. A cleaning device is moved in conjunction with the rotary shaft and includes upper and lower flushing cocks communicating with an outflow valve via the shaft for cleaning the candles during a backflushing operation. The upper flushing cock 27 is offset by an angle in the direction of rotation in relation to the lower flushing cock 37. A lower closure element 38 moves in conjunction with the upper flushing cock at the opposite end of a filter candle(s) selected for backflushing. Likewise, an upper closure element is associated with the lower flushing cock. The candles can be reverse-flushed in opposite directions and at different times by the flushing cocks and closure elements. The flushing cocks and closure elements are moved inside annular deflection hoods 60, 70.

20 Claims, 2 Drawing Sheets

BACKFLUSH FILTER, IN PARTICULAR FOR FILTERING LUBRICANT OIL

This invention relates to a backflushing filter, particularly for the filtration of lubricating oil and fuels.

Reversible flow filters are preferably used for the filtration of fuels and lubricating oils for machines, engines, ships' engines and the like. In corresponding backflushing filters, filter candles are disposed around a filter axis inside a filter housing, and the sludge to be purified flows through the open inflow ends into the interior space of the filter candles. A partial stream of this liquid flows as a filtrate through the filter candle walls into the filtrate space, and is fed from there to the filter outlet. A cleaning device is provided for the continuous operation of backflushing filters, and is rotated from filter candle to filter candle by means of a rotary shaft disposed on the centre line of the filter, in order to discharge particles of contaminants which are deposited on the inner faces of the filter candles into an outlet line. The outlet line can be alternately opened or closed by means of an outflow valve.

DE 31 15 716 C2 discloses a backflushing filter comprising filter candles through which flow occurs from one end, wherein the cleaning device comprises a flushing element which rotates inside a housing part in which branching channels for each filter candle are formed. The flushing element is disposed in the interior of a cylindrical flushing drum comprising a multiplicity of radial openings, and in backflushing operation connects each branching channel to a flushing channel or to a sludge outlet valve. The manufacturing cost of the drum-shaped flushing element and of the housing part with the branching channels is high.

A backflushing filter is known from EP 656 233 B1 in which in filtration operation flow occurs through the filter candles from the inside to the outside, and in backflushing operation flow occurs from the outside to the inside. The upper and lower inflow ends of the filter elements are open and are disposed on perforated plates.

An L-shaped flushing cock which is connected to a contaminant take-off line slides past the lower perforated plate in order to clean individual filter elements during backflushing operation. In order to adjust the pressure level in the filter candle which is to be reverse-flushed, a throttle element which is moved with the flushing cock is disposed at the opposite inflow end of the filter candle to the flushing cock, and partially covers said inflow end during backflushing operation. The advantages of this are firstly that cleaning is effected by the filtrate which flows back into the filter candle via the filter walls, and secondly the contaminant particles which are detached from the inner wall are flushed away with the sludge in turbulent, transverse flow to the direction of filtration. The efficacy of this backflushing filter is high and the loss of filtered liquid in backflushing operation is relatively low.

The present invention starts in its pre-characterising clause from the backflushing filter which is known from DE-AS 1 299 284. The latter document discloses a backflushing filter comprising filter candles which are open at both ends and which are disposed around a rotary shaft in the filter housing, the interior space of which filter candles can be acted upon in filtration operation by a sludge which flows into the backflushing filter. A cleaning device is moved by means of a rotary shaft and comprises at least two flushing cocks, which communicate with an outflow valve via the rotary shaft, for cleaning the filter candles individually or in groups during a backflushing operation, wherein the first flushing cock moves over the upper filter candle ends which are disposed in perforated plates and the other flushing cock moves over the lower filter candle ends which are disposed in a lower perforated plate. When a filter candle is in backflushing operation, both inflow ends of this filter candle are connected by the flushing cocks to the outlet valve, so that reverse flushing is effected simultaneously in opposite directions at both inflow ends. The outlet valve is only operated when both flushing cocks cover the ends of a filter candle. The loss of filtrate in backflushing operation is high.

The object of the present invention is to create a backflushing filter which has a high filter output and which also develops a correspondingly high cleaning effect in backflushing operation.

This object is achieved by the invention of the preferred embodiment in that the first flushing cock is offset by an angle in the direction of rotation in relation to the second flushing cock and a first and a second closure element for the opposite filter candle end face are associated with the first and second flushing cocks and are moved in conjunction therewith. Offsetting the flushing cocks by an angle in the direction of rotation makes it possible for the filter candles to be acted upon by the flushing pressure at both inflow ends at different times. At a given point in time, the opposite inflow end to the flushing cock (e.g. to the upper flushing cock) is closed by means of the (lower) closure element, so that the applied flushing suction can be fully developed in one direction. At a different time in relation thereto, the filter candle is reverse-flushed in the other direction at its other (lower) inflow end. In this situation, the flushing pressure can then be fully developed in the other direction of flushing, since the opposite (upper) inflow end is closed simultaneously by the associated closure element. By means of this backflushing in opposite directions at different times, a higher flushing velocity or flushing velocity profile can be achieved over the height of the filter, so that, particularly in the middle regions between the inflow ends, an improved flushing effect is achieved due to the high flushing velocities which act there.

In one preferred embodiment, deflection hoods which comprise chambers are disposed at the filter candle end faces, wherein the inflow ends of a plurality of filter candles are connected to one chamber. By this measure, a plurality of filter elements can be reverse-flushed in groups, wherein the wear on the contact face between the flushing cocks and the deflection hoods is relatively low despite said backflushing in groups. The deflection hoods are preferably of annular construction, and the flushing cocks and closure elements are associated with the inner annular flange of the deflection hoods. The flushing cocks and closure elements can then be made relatively short, since they move inside the filter circles formed by the filter candles or inside the deflection hoods.

The chambers are preferably disposed uniformly distributed over the periphery. At the same time, the flushing cocks and closure elements can be constructed so that they completely cover the opening of a chamber at the annular flange, so that only the filter candles which are connected to one of the chambers are in backflushing operation, whilst all the other chambers or filter candles are available for filtration operation.

Since a further flushing cock is disposed at the opposite inflow end of the backflushing filters according to the invention, the first flushing cock is preferably offset in relation to the second flushing cock so that at defined angles of rotation only one of each of the flushing cocks is active for backflushing operation, whilst the other flushing cock is inactive. Due to this measure, the flushing pressure which is applied via the outlet valve is fully available for the backflushing of the filter candle associated with a single chamber. The flushing cock which has just become inactive preferably does not then close a chamber, so that the filter candles or chambers which are situated near the inactive flushing cock are still available for filtration operation. These advantages can be achieved in particular if the flushing cocks comprise radial flushing cock openings, the opening width of which in the direction of rotation is less than or equal to the opening width of the chamber opening at the radial flange of the deflection hoods. The cock openings can then be closed by the chamber delimiting walls, so that the flushing cocks are inactive in the corresponding position of rotation.

A simpler form of construction results if a flushing cock and a closure element each form the opposite ends of a flushing arm, wherein an offset angle is provided between the flushing cock and the closure element. The offset angle between the flushing cock and the closure element then determines the angle between the two flushing cocks. The offset angle preferably corresponds to half the included angle of the chamber or to an integral multiple thereof, so that when the first flushing cock completely covers a chamber the other flushing cock is just situated centrally between two chambers, so that the radial, centrally disposed flushing cock opening can therefore be closed by the delimiting wall. The flushing cocks can be wider than the closure elements in the direction of rotation, in order to assist the cleaning process by backflushing in transverse flow.

Other advantages and forms of the invention follow from the subsidiary claims and from the following description of an example of an embodiment, which explains the principle of the invention.

Figure 1:
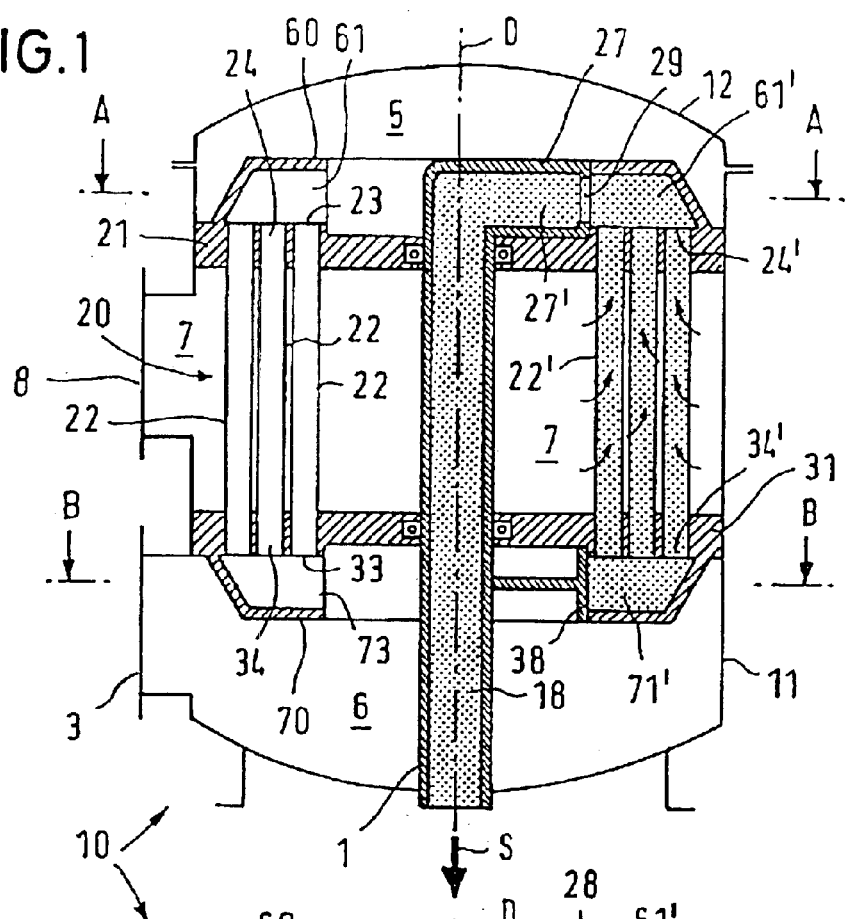
FIG. 1 is a schematic longitudinal section through a backflushing filter, showing the backflushing of filter candles at the upper inflow ends thereof.
Figure 2:
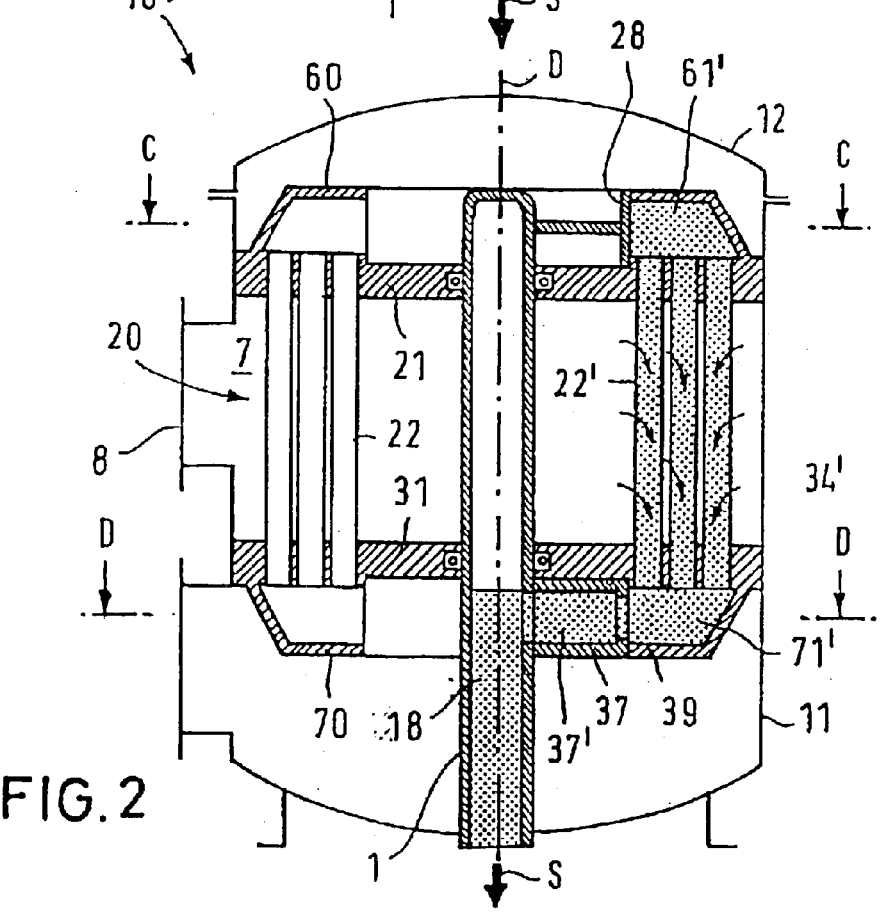
FIG. 2 is a schematic sectional view corresponding to FIG. 1, showing the backflushing of the same filter elements at the lower inflow ends thereof at a different time.

FIGS. 1 and 2 are schematic illustrations of a backflushing filter comprising a filter housing 11 and a housing cover 12. A filter insert 20 is disposed in the interior space of the filter housing 11 and the housing cover 12, and comprises a multiplicity of filter elements 22, 22' which are disposed concentrically around a rotary-and filter axis D. Filter elements 22 are in filtration operation, and filter elements 22' are in backflushing operation, as will be explained below. Filter elements 22, 22' are clamped between an upper perforated plate 21 and a lower perforated plate 31, so that in filtration operation a sludge to be filtered which enters the backflushing filter 10 through a filter inlet 3 flows into the upper inflow ends 24 and into the lower inflow ends 34 of the filter candles 22. The sludge flows through the filter walls of the filter elements 22 from the inside to the outside and enters a filtrate chamber 7 as a filtrate. From the filtrate chamber, the filtrate can be fed back via the filtrate outlet 8 to an engine or the like. At the same time, the sludge can overflow from a sludge chamber 6 on the inlet side via channels or openings (not shown) in the perforated plates 21, 31 into the interior space 5 of the housing cover.

As is shown schematically in FIGS. 1 and 2, an annular upper or lower deflection hood 60, 70 is disposed at the upper or lower filter candle end faces 23, 33, respectively. As can be seen from FIGS. 3A to 4B, the deflection hood comprises a plurality of chambers 61, 61'; 71, 71' which are uniformly distributed over the periphery. FIGS. 3A to 4B also show that a plurality of filter elements 22 is disposed on a radial line R in each chamber 61; 71, and that the individual filter chambers 61, 71 are completely separated from each other by radial delimiting partition walls 62, 72. The deflection hoods 60, 70 or the individual chambers 61, 61'; 71, 71' are open at the radially inwardly situated annular flange 63, 73, so that in filtration operation the sludge can enter the chambers 61, 71 via the openings 64, 74 on the annular flange 63, 73, and from there can enter the filter elements 22.

As is also shown in FIGS. 1 and 2, a rotary shaft 1 is mounted in the perforated plates 21, 31 so that it can rotate about the axis of rotation D. The rotary shaft 1 is hollow, so that the hollow section of the rotary shaft 1 can form a contaminant take-off line 18 which can be connected to the ambient pressure via an outflow valve, which is not illustrated, for the backflushing of the filter elements 22'. The rotary shaft 1 is attached fixed in rotation to an upper, first flushing cock 27 and to a lower, first closure element 38 (FIG. 1) and is also attached to a lower, second flushing cock 37 and to an upper, second closure element 28. The cavities 27', 37' in the flushing cocks 27, 37 are each connected to the contaminant take-off line 18. The flushing cocks 27, 37 and the closure elements 28, 38 are moved past the radially inwardly situated annular flange 63, 73 of the deflection hoods 60, 70, and can be provided with a wear-resistant lining at their contact faces with the annular flange 63, 73. The flushing cocks 27, 37 each comprise a radial opening 29, 39, which, as shown in FIGS. 1 and 2, extends substantially over the height of the deflection hoods 60, 70, but which is significantly narrower in the direction of rotation than are the inlet openings 64, 74 on the annular flange 63, 73 of the deflection hoods 60, 70. In particular, and as shown in FIGS. 3B and 4A, the width of the openings 29, 39 in the direction of rotation can be selected so that this width is equal to the width of the chamber wall 62, 72.

Figure 3A:
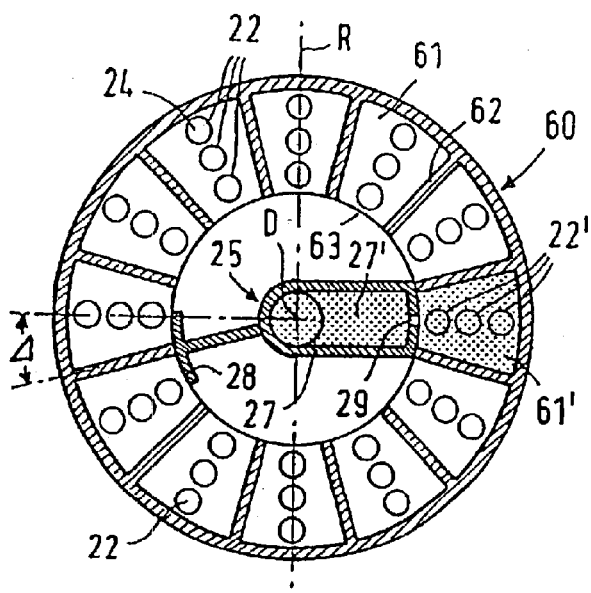
FIG. 3A is a schematic view along line A—A in FIG. 1.

In the Figures, the regions of the backflushing filter which are in backflushing operation are indicated by the dot-pattern shading. In FIGS. 1 and 2, the flushing suction which is applied via the outflow valve and the contaminant take-off line 18 is indicated by the black arrow S. FIGS. 1 and 2 show the backflushing operation in situations at different times. FIGS. 1, 3A and 3B show a situation in which the upper flushing cock 27 seals the upper chamber 61', to which the filter candles 22' are connected, from the flow of sludge, and connects it to the contaminant take-off line. Filtrate is drawn by suction, by the flushing suction S, from the filtrate chamber 7 through the walls of the filter elements 22' into the interior space of the filter elements 22', so that the contaminant particles which have been deposited on the inner walls during filtration operation, which takes place in the opposite direction, are detached. The entry of the filtrate into the interior space is indicated by the arrows. The closure element 38 on the lower deflection hood 70 correspondingly closes the lower chamber 71' which is connected to these filter elements 22', so that in the situation shown in FIG. 1 sludge is drawn by suction into the filter interior space through the lower inflow end 34' which is opposite to the upper inflow end 24'.

Figure 3B:
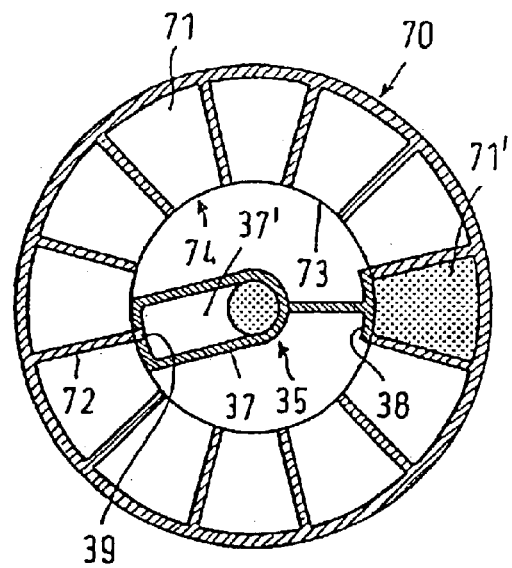
FIG. 3B is a schematic view along line B—B in FIG. 1.

The position of rotation and the relative location of the flushing cock 27 and the closure element 38 to each other in the situation shown in FIG. 1 is illustrated particularly clearly in FIGS. 3A and 3B. In particular, it can be seen from these Figures that at the time corresponding to FIG. 1 the closure element 28, which together with the flushing cock 27 forms an upper flushing arm 25, is situated in a position in which it is inactive, i.e. it does not close a chamber 61 at the upper deflection hood 60. The flushing cock 37, which together with the closure element 38 forms the lower flushing arm 35, is likewise inactive, and in particular the flushing cock opening 39 of the lower flushing cock 37 is situated directly on the delimiting wall 72, so that the flushing cock 37 is closed, i.e. no sludge can enter the flushing cock 37 through the flushing cock opening 39. This effect is achieved because although the flushing cock 27 and the closure element 28; 37; 38 form the opposite ends of the flushing arm 25, 35, there is an offset angle Δ between them. This offset angle Δ corresponds to half the included angle of the chamber 6, i.e. in the embodiment exemplified, which has 12 chambers, it corresponds to an angle Δ of 15°. The angle by which the flushing cocks 27, 37 are offset in relation to each other is therefore accordingly 165° or 195° depending on the direction of rotation.

Figure 4A:
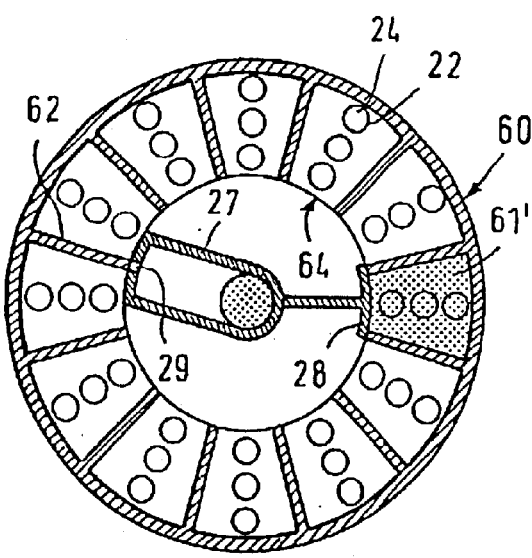
FIG. 4A is a schematic view along line C—C in FIG. 2.
Figure 4B:
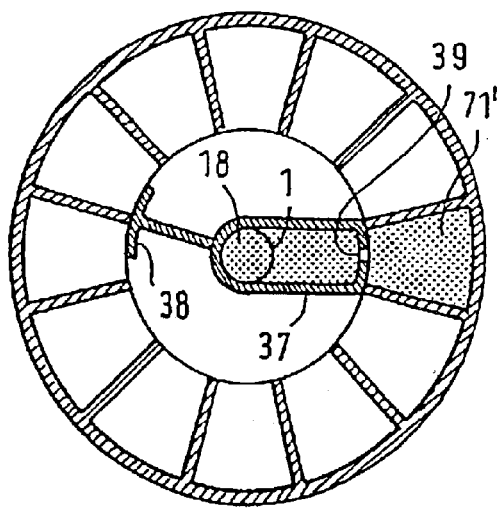
FIG. 4B is a schematic view along line D—D in FIG. 2.

FIGS. 2, 4A and 4B show the situation for the backflushing of the same filter elements 22' at the lower inflow end 34' at a different time. The flushing cocks are rotated, continuously or in steps, by a drive mechanism which is not illustrated but which is preferably disposed outside the filter housing or is flanged thereto. The closure element 28 then seals the upper chamber 61' from the sludge, so that filtrate passes through the walls of the filter elements 22' due to the flushing suction S which is applied via the flushing cock 37, and the detached deposits are conveyed to the outflow valve via the chamber 71' and the lower region of the contaminant line 18. As described above, in this situation the cock opening 29 on the upper flushing cock 27 is closed by the delimiting wall 62, so that the full flushing suction S is again effective at the lower inflow end 34'. Therefore, the flushing suction for backflushing flow for each unit of time is limited to one chamber 61', 71' or to a limited number of filter elements 22' and to one of their inflow ends 24'; 34'. Accordingly, the flushing effect is considerable.

The backflushing operation described above, which is effected counter-current to the direction of filtration, can also be assisted by backflushing with turbulent, transverse flow, by causing the outflow valve to remain open shortly before the position shown in the Figures is reached and shortly after the position shown in the Figures is reached, so that a surge of slurry enters the chambers and filter elements 22' for a short time.

A series of modifications which fall within the scope of patent protection will be apparent to one skilled in the art. Thus the deflection hoods and perforated plates can be constructed in one piece or the deflection hoods can be screwed to the perforated plates. A one-piece or multi-part design, optionally comprising closure arms which can be fitted rotationally fixed to the rotary shaft, can also be selected for the closure elements and flushing cocks. The flushing cocks can be made wider in the direction of rotation than the closure elements, so that in backflushing operation, even if the closure element is rotated further, the sludge which enters the filter elements can still be removed by suction via the contaminant take-off line. The offset between the flushing cocks and the closure elements can correspond to any integral multiple of the given offset angle, so that the angle between the flushing cocks is also altered correspondingly. At a high density of filter candles on a filter circle or circles, a plurality of flushing cocks can also be provided for each inflow end face. The flushing cocks at the upper and lower inflow ends can be disposed in relation to each other so that the filter candles are reverse-flushed in opposite directions directly in succession. In order to achieve a higher filter candle density, more filter candles can be disposed on the outer filter circles than on the inner filter circles.

What is claimed is:

1. A backflushing filter, particularly for the filtration of lubricating oil, comprising filter candles which are open at both end faces and which are disposed around a rotary shaft in the filter housing, the interior space of which filter candles can be acted upon in filtration operation by a sludge which flows into the backflushing filter, and comprising a cleaning device which is moved by means of the rotary shaft and which comprises at least two flushing cocks which communicate with an outflow valve via the rotary shaft for cleaning the filter candles individually or in groups during a backflushing operation, wherein the first flushing cock is associated with one filter candle end face and the other flushing cock is associated with the other filter candle end face, wherein the first flushing cock (27) is offset by an angle in the direction of rotation in relation to the second flushing cock (37) and wherein said cleaning device further comprises first and second closure elements (28, 38) respectively associated with the first and second flushing cocks (27, 37) and moved in conjunction therewith, wherein said cleaning device is configured such that when one of said flushing cocks communicates with an end face of a selective filter candle. the closing element associated therewith closes off the opposite end face of said selected filter candle.

2. A backflushing filter according to claim 1, further comprising deflection hoods (60, 70) which comprise chambers (61, 71) are disposed at the filter candle end faces (23, 33), wherein the inflow ends (24, 34) of a plurality of filter candles (22) are connected to one chamber (60, 70).

3. A backflushing filter according to claim 2, wherein the deflection hoods (60, 70) are of annular construction and the flushing cocks (27, 37) and closure elements (28, 38) are associated with the radially inner annular flange (63, 73) of the deflection hoods (60, 70).

4. A backflushing filter according to claim 3, wherein the chambers (60, 70) are disposed uniformly distributed over the periphery.

5. A backflushing filter according to claim 3, wherein the flushing cocks (27, 37) and closure elements (28, 38) are constructed so that they completely cover the opening (64; 74) of a chamber (61, 71) at the annular flange (63, 73).

6. A backflushing filter according to claim 2, wherein the chambers (60, 70) are disposed uniformly distributed over the periphery.

7. A backflushing filter according to claim 6, wherein the flushing cocks (27, 37) and closure elements (28, 38) are constructed so that they completely cover the opening (64; 74) of a chamber (61, 71) at the annular flange (63, 73).

8. A backflushing filter according to any one of claim 2, wherein the flushing cocks (27, 37) and closure elements (28, 38) are constructed so that they completely cover the opening (64; 74) of a chamber (61, 71) at the annular flange (63, 73).

9. A backflushing filter according to claim 8, wherein the flushing cocks (27, 37) and closure elements (28, 38) are constructed so that they completely cover the opening (64; 74) of a chamber (61, 71) at the annular flange (63, 73).

10. A backflushing filter according to any one of claims 2, wherein the flushing cocks (27, 37) comprise radial flushing cock openings (29, 39), the opening width of which in the direction of rotation is less than the opening width of the chamber opening (64; 74) at the radial flange (63; 73) of the deflection hoods (60, 70).

11. A backflushing filter according to claim 10, wherein the opening width of the cock openings (29, 39) is less than or equal to the width of the chamber delimiting walls (62, 72) at the annular flange (63, 73).

12. A backflushing filter according to any one of claims 2, wherein the filter candles (22) which are attached to a chamber (61, 71) are disposed substantially on a radial line (R).

13. A backflushing filter according to any one of claims 2, wherein a flushing cock (27; 37) and a closure element (28; 38) each form the opposite ends of a flushing arm (25, 35), wherein an offset angle (Δ) is provided between the flushing cock (27, 37) and the closure element (28, 38) of a flushing arm (25, 35).

14. A backflushing filter according to claim 13, wherein the offset angle (Δ) corresponds to half the included angle of a chamber (61, 71) or to an integral multiple thereof.

15. A backflushing filter according to claim 2, wherein the first flushing cock (27) and the first closure element (38) are simultaneously associated with the same filter candles (22') or with associated chambers (61', 71') during the rotary movement.

16. A backflushing filter according to claim 1, wherein the first flushing cock (27) is offset in relation to the second flushing cock (37) so that at defined states of rotation only one of each of the flushing cocks (27; 37) is active for a backflushing operation, whilst the other flushing cock (37; 27) is inactive.

17. A backflushing filter according to claim 1, wherein the first and second flushing cocks (27,37) are attached to a common, hollow, central rotary shaft (1).

18. A backflushing filter according to claim 1, wherein the filter candles (22') can be periodically and alternately reverse-flushed in opposite directions by the cleaning device.

19. A backflushing filter according to claim 1 to 12, wherein the flushing cocks are made wider than the closure elements in the direction of rotation.

20. A backflushing filter for filtration of lubricating oil, said filter comprising:

a plurality of filter candles each of which is open at first and second opposite end faces, said plurality of filter candles disposed around a rotary shaft in a filter housing, said plurality of filter candles each having an interior space that is acted upon in a filtration operation by a sludge that flows into the backflushing filter;

a movable cleaning device comprising at least first and second flushing cocks that communicate with an outflow valve by way of the rotary shaft for cleaning a select filter candle of said plurality of filter candles during a backflushing operation, wherein said first flushing cock selectively communicates with said first end face of said select filter candle and said second flushing cock selectively communicates with said second end face of said select filter candle, wherein said first flushing cock (27) is offset by an angle in a direction of rotation of said rotary shaft in relation to the second flushing cock (37); and, first and a second closure elements (28, 38) movable with said rotary shaft and associated with a respective flushing cock, said first closure covering one said end face of said select filter candle when said first flushing cock is in communication with the other said end face of said select filter candle, and said second closure element covering said other end face of said select filter candle when said second flushing cock is in communication with said one end face of said select filter candle.

* * * * *